(12) United States Patent
Channasagara (10) Patent No.: US 8,131,628 B2
(45) Date of Patent: Mar. 6, 2012

(54) SYSTEM, METHOD, AND COMPUTER PROGRAM FOR REALIZING A UNIFIED BROKERAGE ACCESS CHANNEL

(75) Inventor: Nagendra Lakshman Channasagara, Bangalore (IN)

(73) Assignee: INXS Technologies Ltd., Chennai (IN)

( * ) Notice: Subject to any disclaimer, the term of this patent is extended or adjusted under 35 U.S.C. 154(b) by 315 days.

(21) Appl. No.: 11/668,312

(22) Filed: Jan. 29, 2007

(65) Prior Publication Data

US 2007/0179909 A1    Aug. 2, 2007

Related U.S. Application Data

(60) Provisional application No. 60/766,576, filed on Jan. 29, 2006.

(51) Int. Cl.
*G06Q 40/00* (2006.01)

(52) U.S. Cl. ......................................................... 705/37
(58) Field of Classification Search .................... 705/37
See application file for complete search history.

(56) References Cited

U.S. PATENT DOCUMENTS

| | | | | |
|---|---|---|---|---|
| 5,864,827 A | * | 1/1999 | Wilson | 705/35 |
| 2002/0069152 A1 | * | 6/2002 | B.C et al. | 705/37 |
| 2002/0091615 A1 | * | 7/2002 | Salvani | 705/37 |
| 2004/0210504 A1 | * | 10/2004 | Rutman | 705/37 |
| 2010/0125551 A1 | | 5/2010 | Bacila et al. | |

* cited by examiner

*Primary Examiner* — Eric T Wong
(74) *Attorney, Agent, or Firm* — Oblon, Spivak, McClelland, Maier & Neustadt, L.L.P.

(57) ABSTRACT

A brokerage aggregation system, method and computer program for receiving an electronic message having at least one activity request directed to one or more brokerage service firms and outputting the activity request. The system includes an input interface configured to receive the electronic message in a first predetermined format, a plurality of output interfaces, each configured to connect to a corresponding brokerage service firm, and to transmit the at least one activity request in one of a plurality of second predetermined formats, wherein each of the plurality of second predetermined formats corresponds with a particular brokerage service firm, and a controller configured to receive and extract the at least one activity request from the electronic message, determine to which of the plurality of output interfaces the at least one activity request is to be transferred for subsequent transmission to a destination brokerage service firm, reformat the at least one activity request from the first predetermined format to the second predetermined format corresponding to the output interface previously determined, and transfer the at least one activity request after reformatting to the determined output interface for subsequent transmission to the destination brokerage service firm.

14 Claims, 6 Drawing Sheets

ORDER ROUTING TABLE 400

| USER | BROKER | MARKET | GATEWAY | SYMBOLS |
|---|---|---|---|---|
| USER-1 | BROKER-1 | NYSE,NASD | 1 | X |
| USER-1 | BROKER-2 | FTSE | 2 | X |
| USER-1 | BROKER-2 | X | 2 | IBM.L,VMOB... |

SYSTEM, METHOD, AND COMPUTER PROGRAM FOR REALIZING A UNIFIED BROKERAGE ACCESS CHANNEL

CROSS REFERENCE TO RELATED APPLICATION

This patent specification is based on U.S. provisional application 60/766,576, filed on Jan. 29, 2006 in the U.S. Patent and Trademark Office, the entire contents of which are incorporated by reference herein.

BACKGROUND OF THE INVENTION

1. Field of the Invention

This disclosure relates to a system, method, and computer program for providing brokerage services, and particularly for aggregated access to a plurality of brokerage services related to financial markets.

2. Discussion of the Background

Today investors are discovering that computers and, in particular, electronic trading of financial instruments over computer networks such as the Internet, have greatly empowered investors to self-manage and track their financial investment portfolios. Whether an individual investor is seeking to occasionally buy or sell stocks, bonds, or other financial instruments; a day trader conducting numerous such transactions each day; or a professional investor such as a licensed broker who manages the financial portfolios of numerous clients, access via a computer network to financial markets has become increasingly an important channel to conduct these transactions.

The ease of access to electronic trading has opened up great opportunities for novice investors to actively trade and maintain portfolios of their own without requiring participation in mutual funds or assistance from financial advisors or professional portfolio managers. This has resulted in the individual investor gaining hands-on experience with trading in financial instruments such as equities, and allowing them to transition to instruments such as bonds, foreign exchanges, and other instruments over global markets.

In order to have access to concurrent access to multiple markets it is necessary to access multiple brokerage services simultaneously. First, simultaneous brokerage access allows a user to monitor and take actions on multiple markets without delay. Second, this would create a natural competitive market among the participating brokers to offer competitive brokerage commissions. For example, an options specialized broker may offer the best brokerage rates for options contracts while another broker could offer the best margins over equity trades. Similarly a specialized foreign exchange (forex) commodities broker can be in a position to offer the better deal than a generic one.

Traditionally, concurrent trading in multiple markets and multiple instruments has been the domain of big institutional investors due to the resource heavy requirement of having dedicated fund managers for each channel of execution or type of financial instrument or market. However, complex trading strategies are difficult for an individual because usually each brokerage service requires a different access terminal client or user interface that each demands dedicated extra resources when managing a personal portfolio.

SUMMARY OF THE INVENTION

According to an aspect of the present invention, a brokerage aggregation system for receiving an electronic message having at least one activity request directed to one or more brokerage service firms and outputting the activity request includes an input interface configured to receive the electronic message in a first predetermined format, a plurality of output interfaces, each configured to connect to a corresponding brokerage service firm, and to transmit the at least one activity request in one of a plurality of second predetermined formats, wherein each of the plurality of second predetermined formats corresponds with a particular brokerage service firm, and a controller configured to receive and extract the at least one activity request from the electronic message, determine to which of the plurality of output interfaces the at least one activity request is to be transferred for subsequent transmission to a destination brokerage service firm, reformat the at least one activity request from the first predetermined format to the second predetermined format corresponding to the output interface previously determined, and transfer the at least one activity request after reformatting to the determined output interface for subsequent transmission to the destination brokerage service firm.

According to another aspect of the present invention, a brokerage aggregation method for receiving an electronic message having at least one activity request directed to one or more brokerage service firms and outputting the activity request includes receiving from an input interface the electronic message in a first predetermined format; extracting the at least one activity request from the electronic message; determining to which of a plurality of output interfaces the at least one activity request is to be transferred for subsequent transmission to a destination brokerage service firm; reformatting the at least one activity request from the first predetermined format to a second predetermined format corresponding to the output interface previously determined, the second predetermined format corresponding with a particular brokerage service firm; transferring the at least one activity request after reformatting, to the determined output interface; and transmitting the reformatted at least one activity request to the destination brokerage service firm.

Still according to another aspect of the present invention, a computer readable program including instructions for receiving an electronic message having at least one activity request directed to one or more brokerage service firms and outputting the activity request, the computer program being embedded in a computer readable medium, includes receiving from an input interface the electronic message in a first predetermined format; extracting the at least one activity request from the electronic message; determining to which of a plurality of output interfaces the at least one activity request is to be transferred for subsequent transmission to a destination brokerage service firm; reformatting the at least one activity request from the first predetermined format to a second predetermined format corresponding to the output interface previously determined, the second predetermined format corresponding with a particular brokerage service firm; transferring the at least one activity request after reformatting, to the determined output interface; and transmitting the reformatted at least one activity request to the destination brokerage service firm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features may be omitted from or simplified in the specification in order not to obscure the present invention.

Figure 1:
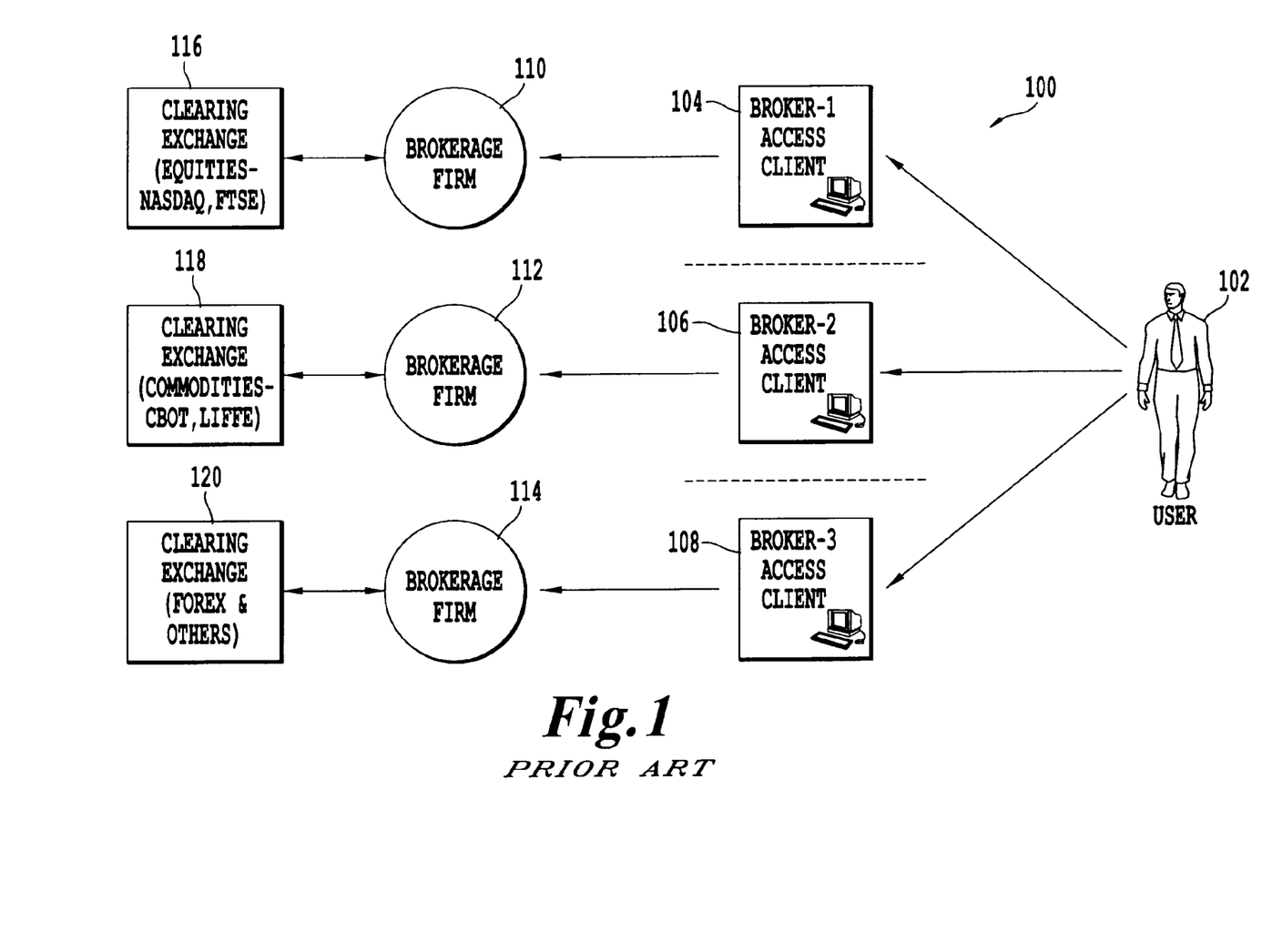
FIG. 1 shows a conventional system for accessing multiple brokerage service firms.

FIG. 1 shows a conventional system 100 used to access multiple brokerage services. In the example of FIG. 1, a user 102 intends to make financial activity requests, such as buying or selling equities, on clearing exchanges 116, 118, and 120. The clearing exchanges can represent one or more financial markets or financial exchange institutions, such as NASDAQ, The New York Stock Exchange, or any foreign exchange. Such clearing exchanges are widely known to the public and those skilled in the art.

The user has accounts with brokerage firms 110, 112, and 114, each firm being able to execute transactions on a different clearing exchange. Such Brokerage firms include for example Ameritrade, E-trade, or Fidelity and other firms that are widely known to the public. The user wishes to maintain access to brokerage firms 110, 112, and 114 concurrently in order to efficiently complete transactions over multiple clearing exchanges. In order to accomplish this, the user must access three separate access clients 104, 106, and 108 simultaneously. FIG. 1 shows that each access client is running on a separate machine, with three separate connections to each brokerage firm, but the access client can also represent different interfaces that must be kept open simultaneously on the same machine. In either case, the user must switch between various user interfaces to complete each transaction, which consumes time and computer resources.

Figure 2:
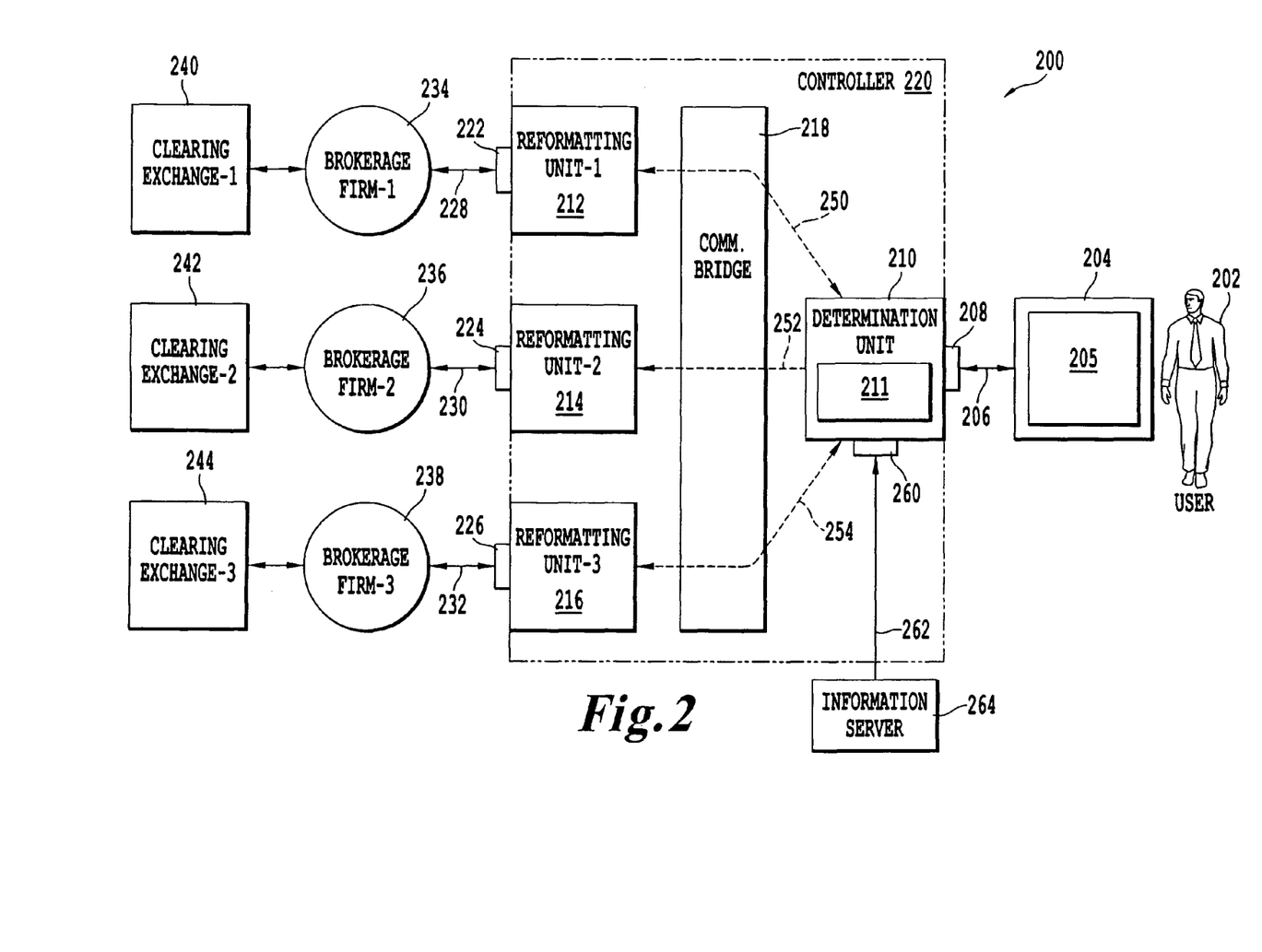
FIG. 2 shows a brokerage aggregator according to one embodiment of the present invention.

FIG. 2 shows one possible implementation of an embodiment of the claimed invention. A Brokerage Aggregation System 200 is shown having a controller 220, an input interface 208, and output interfaces 222, 224, and 226.

In FIG. 2, an access terminal client 204 connects to the input interface 208. Access terminal client 204 is preferably a computer processing unit (CPU) operated by a user 202. However it is not limited to a CPU. Access terminal client 204 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The input interface 208 is preferably an Ethernet interface, however it may be any type of networking interface that is commonly known to those skilled in the art, including but not limited to a wireless interface or a serial interface. The link 206 between the access terminal client 204 and the input interface 208 is optionally achieved by an Ethernet cable connection. However, the link, and any other link or connection described in this specification, may be any type of connection achieved between two electronic devices on a network. Examples of such links are a serial communications link, a wireless connection, or any other type of connection commonly known to achieve network connectivity. Further, the communication link 206 is preferably over any IP access network, including but not limited to various derivatives of IP, TCP, UDP protocol carriers such as Internet, an intranet, a wireless access such as GPRS, a Virtual Private Network (VPN), and other types of communications networks.

The input interface 208 connects to the controller 220. The controller 220 is shown as a sub-system within the Brokerage Aggregation System 200. Controller 220 includes a determination unit 210, communication bridging unit 218, and reformatting units 212, 214, and 216. Throughout this specification, the term "determination unit" may be interchanged with the term "routing unit" or "router" without changing its meaning. Also, the term "reformatting unit" may be interchanged with the term "gateway" or "gateway server" without changing its meaning.

The input interface 208 is connected to the determination unit 210. The determination unit 210 is in one embodiment a CPU, but it may also be any computing device or router with the ability to receive, process, and transmit data according to a routing table. Such devices are commonly known to those skilled in the art.

The determination unit 210 is shown in FIG. 2 with three outputted connections 250, 252, and 254, however there may be any number of outputs depending on the scale of the system. The determination unit also has a storage unit 211 for storing a routing table. The determination unit 210 further has an interface 260 that is connected to an information server 264 via a link 262.

The outputs from determination unit 210 connect to reformatting units 212, 214, and 216. FIG. 2 also shows a communication bridge 218 between the determination unit 210 and the reformatting units, however the determination unit can connect directly to the reformatting units or through any network such as a private network or the internet. There are three reformatting units 212, 214, and 216 shown in FIG. 2, however there may be more depending on the scale of the system. Each reformatting unit may be implemented as a CPU, however it may be any equivalent device that can receive, process, and transmit data.

In an exemplary configuration, each determination unit is connected to a brokerage service firm, such as brokerage firms 234, 236, and 238 via the output interfaces 222, 224, and 226. FIG. 2 shows separate physical interfaces used for the output interfaces 222, 224 and 226, however each output interface may instead be a virtual interface. An example of a virtual interface is where there is a single physical interface that supports one or more network addresses allowing external devices to view each network address as a separate virtual interface.

The links 228, 230, and 232, that are located between each determination unit and each brokerage firm, can be any type of network connection as was discussed above.

FIG. 2 additionally shows clearing exchanges 240, 242, and 244 connected to the brokerage firms 234, 236, and 238 respectively. Each brokerage firm and clearing exchange shown in FIG. 2 may be similar to the brokerage firms and clearing exchanges discussed in reference to the conventional system in FIG. 1.

Next, an operation of the aggregator system 200 will be described.

In the example embodiment of FIG. 2, the client 204 has network connectivity with each brokerage firm 234, 236, and 238. Preferably, this network connectivity can be achieved with normal methods of establishing IP connectivity through an IP network as is well known in the art. In this example, the user has already been authenticated to communicate with each of the brokerage firms upon establishing connectivity with the brokerage firms. Such authentication procedures are well known to those skilled in the art and will not be discussed in detail.

The user 202 interacts with the access terminal client 204. The access terminal client 204 is shown having a graphical user interface (GUI) 205. GUI 205 displays a variety of user options to the user. Through GUI 205, the user can access multiple brokerage services associated with the brokerage firms 234, 236, and 238 to initiate activity requests. Activity requests can be any action requested by the user that pertains to a capability of the system. Examples of activity requests include, but are not limited to, an order request to buy or sell an electronically traded financial instrument, a modification request to modify an order to buy/sell a financial instrument, a request to view the portfolio for a given investor account, and a request to view recent trade history for a given investor account.

After the user makes a selection on a type of activity request, the access terminal client 204 generates an activity request to be sent to the controller 220. The activity request itself contains information data pertaining to the type of specific transaction that the user inputted to the GUI 205. The activity request is contained in an electronic message that is formatted for transmission to the controller 220. It is noted that multiple activity requests may be contained in the message for situations where the user wishes to perform multiple activity requests simultaneously.

The access terminal client 204 formats the message containing the activity request into a common intermediate format (CIF) standard such as Financial Information eXchange (FIX). The FIX standard is exemplary, but any other open standard for formatting financial transactions may be used.

Figure 3:
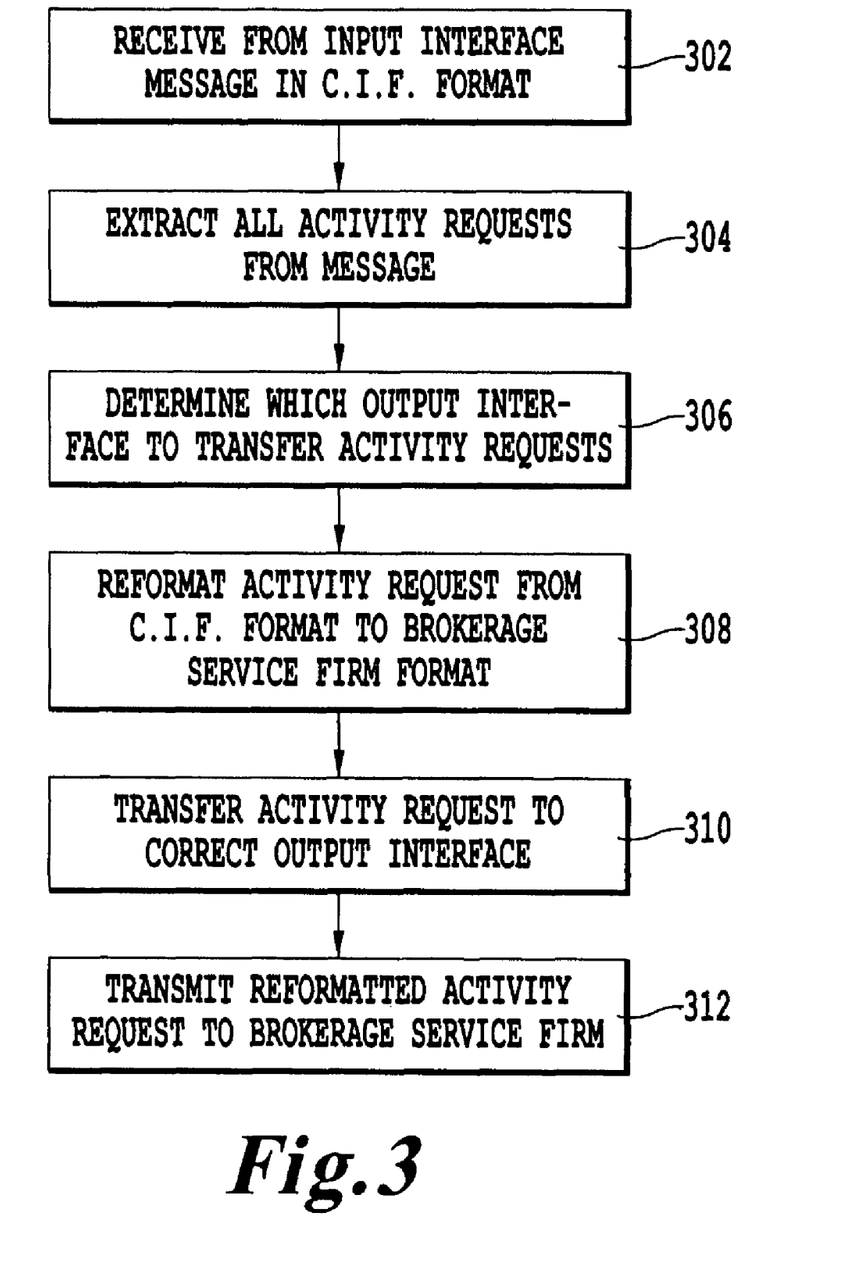
FIG. 3 shows a method of operation of the brokerage aggregator.

A method illustrating how the message from the user 202 is transmitted to the brokerage firms is shown in FIG. 3. In step 302, the input interface 208 receives the message over link 206 and delivers it to the determination unit 210. The determination unit 210 stores an order routing table in the storage unit 211. In step 304, the determination unit 210 extracts the activity request from the message formatted in the common intermediate format (first predetermined format).

In FIG. 3, step 306, the determination unit 210 determines to which output interface to transfer the activity request(s). The activity request or order is matched against the entry in the order routing table for a valid pathway to the brokerage service firm. In this example, the order routing table optionally checks a user ID, a destination brokerage firm ID, and then checks to see the proper destination reformatting unit 212, 214, or 216. If a valid entry exists, the same order still in the common intermediate format is forwarded further to the proper reformatting unit.

Figure 4:
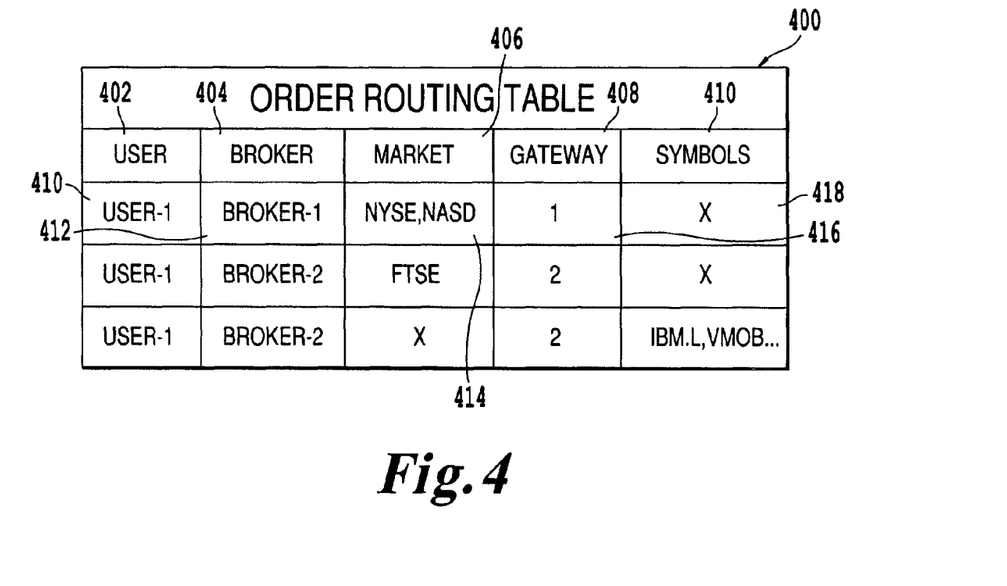
FIG. 4 shows a routing table used by the brokerage aggregator according to an embodiment of the invention.

An exemplary order routing table 400 is illustrated in FIG. 4. The activity request is checked to see which user and which broker have been specified. The "Gateway" column 408 indicates which gateway, or reformatting unit the request will be routed to. As an optional column, the type of market as listed in column 406 may be specified in the activity request as an indicator on where to route the message.

Additionally, a list of symbols to route to a specific brokerage firm may be in an optional column 410 (example "IBM.L" traded on FTSE is linked to "BROKER-2" for execution action in FTSE not NYSE that "BROKER-1" provides which is also associated with "USER-1"). The information illustrated in FIG. 4 is exemplary only. Other types of electronic information in other formats can also be used and the invention is not limited to the electronic information displayed in FIG. 4.

In FIG. 3, step 308, the reformatting unit receives the activity request from the determination unit and reformats it from the CIF format to the brokerage firm format (second predetermined format) for the corresponding destination brokerage service firm. Each reformatting unit maintains a communication link with a specific brokerage service firm. The brokerage service firm may be a private institution that is designed to receive activity requests in a predetermined format or protocol. The protocol employed by each brokerage firm will be different from the CIF used by the terminal access client 204, and in many cases the protocol used by the brokerage service firm will be proprietary to the brokerage service firm.

In FIG. 3, step 310, the reformatting unit transfers the reformatted activity request to a corresponding output interface, which is either 222, 224, or 226 in FIG. 2. Then, in step 312, the output interface transmits the reformatted activity request to the destination brokerage firm.

Figure 5:
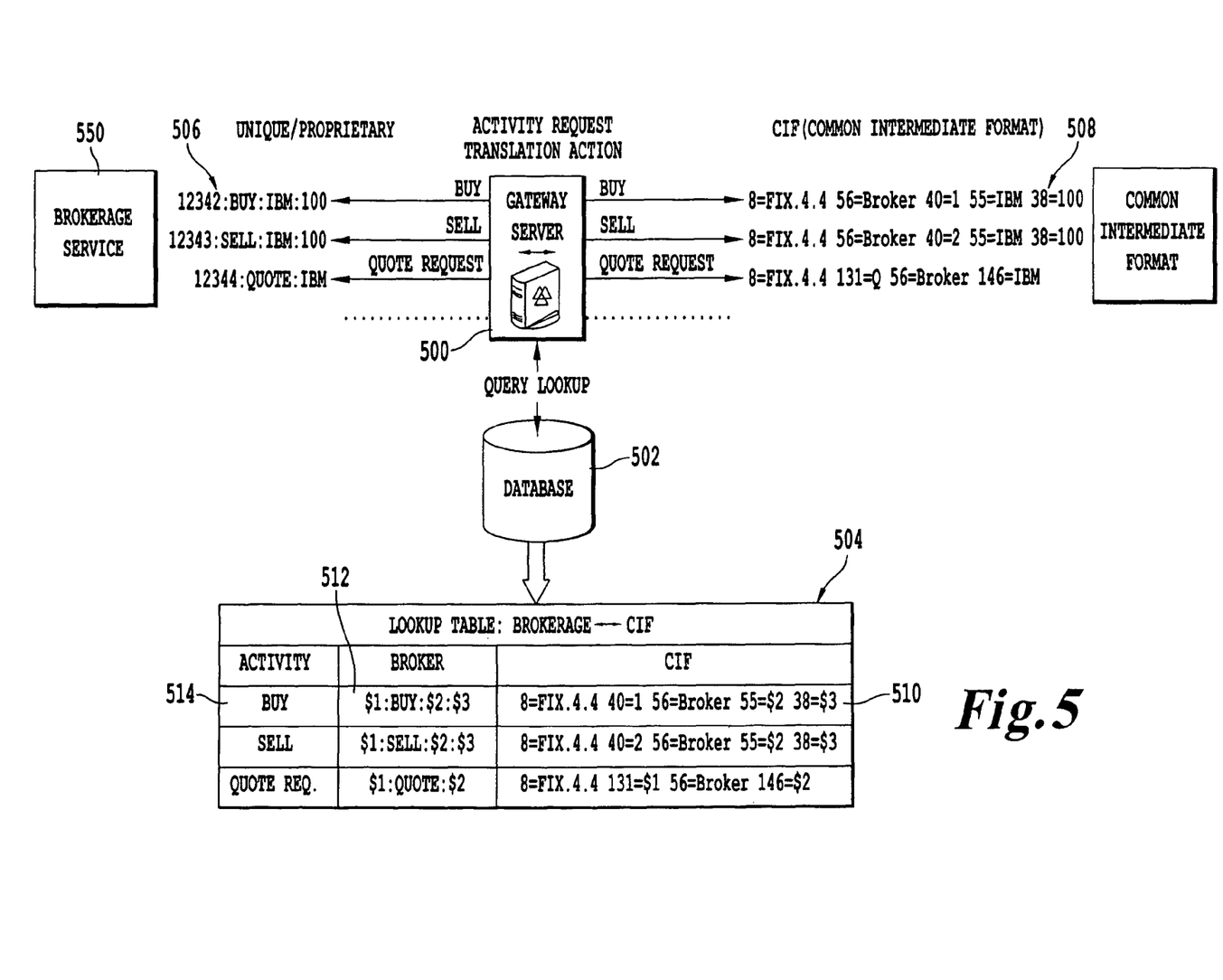
FIG. 5 shows a method of operation of a reformatting unit used by the brokerage aggregator according to an embodiment of the present invention.

FIG. 5 shows an example activity request and the resulting translating action the gateway server performs. Here an activity request such as 508 for a buy order of 100 stocks of symbol IBM at market price is requested from access terminal client, and the request in common intermediate format (such as FIX). The activity request is transformed into the broker specific format using the database 502 based on table 504. A sample structure of table 504 is shown in FIG. 5 and may contain an activity type (such as 514), a broker side proprietary format string (such as 512) and a system side common intermediate format (such as 510).

Although not shown in FIG. 5, it should be understood that the similar reverse transformation from proprietary brokerage format to common intermediate format is also performed for resulting response in connection to the original user activity request. In FIG. 5 when the brokerage service 550 informs the relaying gateway 500 of the order's execution or resulting status in response to user's activity request, the response is translated back into the common intermediate format and is relayed back to the access terminal client for display to the user.

Thus, the above disclosed configuration allows the user to use a single graphical user interface to communicate with multiple brokerage service firms that use various different protocols.

FIG. 2 shows an additional interface 260 connected to the determination unit 210. The interface 260 allows the determination unit to be connected to an information server 264 over communications link 262. The information server 264 provides information data to the determination unit such as financial news, brokerage firm information, and financial market values. The information provided by information server 264 is preferably in quantifiable numerical form, such as stock quotes, or price information about brokerage firm rates. An example of such an information server is any web-based stock tracker such as Google Finance or Yahoo Finance.

The determination unit 210 can utilize the information received from the information server in multiple ways. The determination unit can update the routing table 400 with an indication of a stock that is available on a particular market. Additionally, the determination unit 210 can have a triggering mechanism in which the change in price of a stock can trigger a buy or sell order if the stock reaches a certain price. The stock price that triggers such an action can be pre-programmed into the determination unit 210 by the user. When the determination unit 210 triggers such a buy or sell order it then generates an activity request as if the user had sent it. The activity request is then forwarded to the proper reformatting unit based on the route indicated in the routing table, which then forwards the activity request to the designated brokerage firm.

Figure 6:
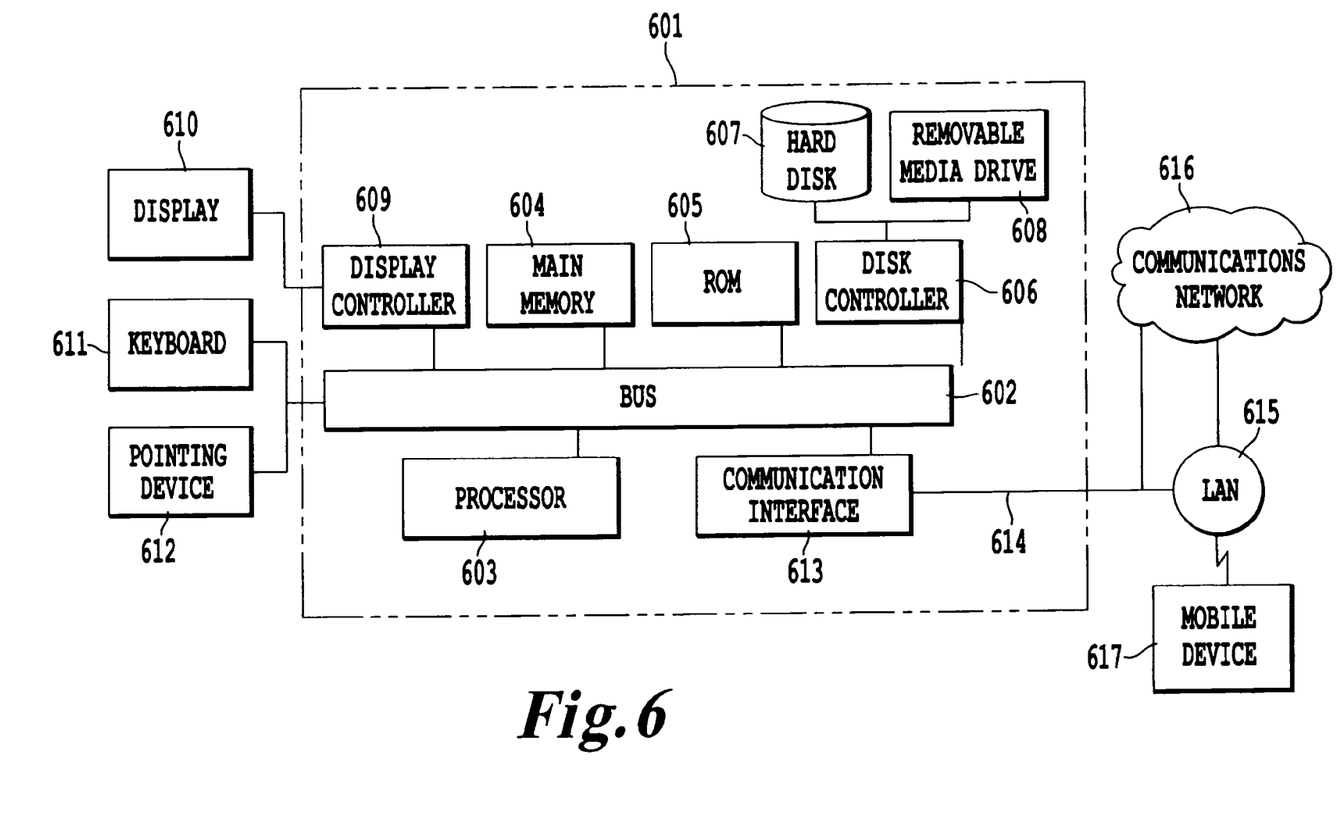
FIG. 6 shows one implementation of a computer processing unit used in the present invention.

FIG. 6 illustrates a computer system 601 upon which the access client terminal 204, the determination unit 210, and the reformatting units 212, 214, and 216 of FIG. 2 may be implemented. The computer system 601 includes a bus 602 or other communication mechanism for communicating information, and a processor 603 coupled with the bus 602 for processing the information. The computer system 601 also includes a main memory 604, such as a random access memory (RAM) or other dynamic storage device (e.g., dynamic RAM (DRAM), static RAM (SRAM), and synchronous DRAM (SDRAM)), coupled to the bus 602 for storing information and instructions to be executed by processor 603. In addition, the main memory 604 may be used for storing temporary variables or other intermediate information during the execution of instructions by the processor 603. The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 601 may also include a display controller 609 coupled to the bus 602 to control a display 610, such as a cathode ray tube (CRT), for displaying information to a computer user. The computer system includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the invention in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 601, for driving a device or devices for implementing the invention, and for enabling the computer system 601 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 603 for execution. A computer readable medium may take many forms, including but not limited to, non-volatile media, volatile media, and transmission media. Non-volatile media includes, for example, optical, magnetic disks, and magneto-optical disks, such as the hard disk 607 or the removable media drive 608. Volatile media includes dynamic memory, such as the main memory 604. Transmission media includes coaxial cables, copper wire and fiber optics, including the wires that make up the bus 602. Transmission media also may also take the form of acoustic or light waves, such as those generated during radio wave and infrared data communications.

Various forms of computer readable media may be involved in carrying out one or more sequences of one or more instructions to processor 603 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 601 may receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 604, from which the processor 603 retrieves and executes the instructions. The instructions received by the main memory 604 may optionally be stored on storage device 607 or 608 either before or after execution by processor 603.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a network interface card to attach to any packet switched LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

What is claimed is:

1. A brokerage aggregation system including an order execution device having a computer processor and a main memory, comprising:
    an input interface of the order execution device configured
        to receive a single electronic message including a plurality of activity requests, each activity request being directed to a corresponding brokerage service firm from among a plurality of brokerage service firms, and the electronic message being sent by a user to the input interface in a first predetermined format;
    a plurality of output interfaces, each output interface configured
        to connect to a corresponding brokerage service firm of the plurality of brokerage service firms, and
        to transmit each of the plurality of activity requests in one of a plurality of second predetermined formats, wherein each of the plurality of second predetermined formats corresponds with a corresponding brokerage service firm from among the plurality of brokerage service firms; and
    a controller of the order execution device configured to
        receive the electronic message including the plurality of activity requests,
        simultaneously extract each activity request from among the plurality of activity requests included in the single electronic message,
        determine to which of the plurality of output interfaces each of the plurality of activity requests is to be transferred for subsequent transmission to the corresponding brokerage service firm,
        reformat each of the plurality of activity requests from the first predetermined format to the second predetermined format corresponding to the output interface previously determined, and
        transfer each of the plurality of activity requests after reformatting to the output interface previously determined for subsequent transmission to the corresponding brokerage service firm based on an association between respective of the plurality of output interfaces and the plurality of brokerage service firms, wherein
    each corresponding brokerage service firm transfers each plurality request to a corresponding clearing exchange associated with said each plurality request,
    wherein the controller further comprises:
    a storage unit configured to store a predetermined table, the predetermined table storing an identification of a user, an identification of a financial instrument, and a destination for each of the plurality of activity requests, wherein the controller is configured to determine the destination to which of the plurality of output interfaces the plurality of activity requests are to be transmitted based on the predetermined table, and
    a data interface configured to receive information data from an information provider, the received information including a trading availability status of a financial instrument at the destination, wherein the controller is further configured to update the predetermined table to optimize the destination based on the information data received.

2. The system of claim 1, wherein one or more of the plurality of output interfaces is a virtual interface.

3. The system of claim 1, wherein the controller further comprises:
    a plurality of reformatting units, each reformatting unit being associated with a corresponding one of the plurality of output interfaces, having access to a database, and being configured to perform the reformatting of each of the plurality of activity requests from the first predetermined format to the second predetermined format using the database.

4. The system of claim 1, wherein the information data further includes one of financial news, brokerage firm information, and financial market values.

5. The system of claim 4, wherein the controller further comprises:
a triggering mechanism that automatically generates an automated activity request based on the received information data, and the automated activity request being formatted in the first predetermined format,
wherein the controller determines to which of the plurality of output interfaces the automated activity request is transferred.

6. The system of claim 1, further comprising:
a client terminal unit connected to the input interface and configured to generate the electronic message,
wherein the client terminal unit includes a single user interface displaying user options related to the plurality of brokerage service firms.

7. A brokerage aggregation method of exchanging order information between an order execution device and a plurality of brokerage service firms, comprising:
receiving at an input interface of the order execution device a single electronic message in a first predetermined format from a user, the electronic message having a plurality of activity requests, each activity request being directed to a corresponding brokerage service firm from among the plurality of brokerage service firms;
simultaneously extracting each activity request from among the plurality of activity requests included in the single electronic message;
determining to which of a plurality of output interfaces each of the plurality of activity requests is to be transferred for subsequent transmission to a destination brokerage service firm, each of the plurality of output interfaces being associated with a member of a plurality of destination brokerage service firms, the plurality of destination brokerage service firms including the destination brokerage service firm;
reformatting each of the plurality of activity requests from the first predetermined format to a second predetermined format corresponding to the output interface previously determined, the second predetermined format corresponding with the brokerage service firm associated with the output interface previously determined;
transferring each of the plurality of activity requests after reformatting, to the output interface previously determined based on an association between respective of the plurality of output interfaces and the plurality of brokerage service firms;
transmitting each of the activity requests after reformatting from the output interface to the brokerage service firm associated with the output interface;
transmitting, from each corresponding brokerage service firm, each plurality request to a corresponding clearing exchange associated with said each plurality request,
storing a predetermined table which includes an identification of the user, an identification of a financial instrument, and a destination for the plurality of activity requests;
determining the destination to which of the plurality of output interfaces each of the plurality of activity requests is to be transmitted based on the predetermined table;
receiving information data from an information provider; and
updating the predetermined table to optimize the determining of the destination based on the information data received.

8. The method of claim 7, wherein the information data received includes one of financial news, brokerage firm information, and financial market values.

9. The method of claim 8, further comprising:
generating automatically an automated activity request based on the information data received, and the automated activity request being formatted in the first predetermined format; and
determining a destination to which of the plurality of output interfaces the automated activity request is transferred.

10. The method of claim 7, further comprising:
displaying user options in a single user interface related to the brokerage service firms.

11. A computer-readable storage medium on which computer-readable instructions are recorded, the instructions are accessed and executed by an order execution device to implement a method of exchanging order information between a user and a plurality of brokerage firms, the instructions comprising:
receiving at an input interface of the order execution device a single electronic message in a first predetermined format from a user, the electronic message having a plurality of activity requests, each activity request being directed to a corresponding brokerage service firm from among the plurality of brokerage service firms;
simultaneously extracting each activity request from among the plurality of activity requests included in the single electronic message;
determining to which of a plurality of output interfaces each of the plurality of activity requests is to be transferred for subsequent transmission to a destination brokerage service firm, each of the plurality of output interfaces being associated with a member of a plurality of destination brokerage service firms, the plurality of destination brokerage service firms including the destination brokerage service firm;
reformatting each of the activity requests from the first predetermined format to a second predetermined format corresponding to the output interface previously determined, the second predetermined format corresponding with the brokerage service firm associated with the output interface previously determined;
transferring each of the plurality of activity requests after reformatting, to the output interface previously determined based on an association between respective of the plurality of output interfaces and the plurality of brokerage service firms;
transmitting each of the activity requests after reformatting from the output interface to the brokerage service firm associated with the output interface;
transmitting, from each corresponding brokerage service firm, each plurality request to a corresponding clearing exchange associated with said each plurality request;

storing a predetermined table, the predetermined table including an identification of the user, an identification of a financial instrument, and a destination for the plurality of activity requests;

determining the destination to which of the plurality of output interfaces each of the plurality of activity requests is to be transmitted based on the predetermined table;

receiving information data from an information provider; and updating the predetermined table to optimize the determining of the destination based on the information data received.

12. The computer-readable storage medium of claim 11, wherein the information data received includes one of financial news, brokerage firm information, and financial market values.

13. The computer-readable storage medium of claim 12, further comprising:

generating automatically an automated activity request based on the information data received, and the automated activity request being formatted in the first predetermined format; and determining a destination to which of the plurality of output interfaces the automated activity request is transferred.

14. The computer-readable storage medium of claim 11, further comprising:

displaying user options in a single user interface related to the brokerage service firms.

* * * * *